UNITED STATES PATENT OFFICE 2,015,748

METHOD FOR PRODUCING POUR INHIBITORS

Per K. Frolich, Roselle, N. J., assignor to Standard Oil Development Company, a corporation of Delaware No Drawing. Application June 30, 1933, Serial No. 678,480

7 Claims. (Cl. 260—168)

The present invention relates to improved lubricating oils and more specifically to an improved method for producing pour inhibitors for use therein. The invention will be fully understood from the following description.

It has been previously disclosed that the addition of certain substances to wax containing oils modifies the wax crystallization in such a way as to substantially reduce the pour point of the oil and to greatly increase the ease with which the wax is separated from the oil. Among such substances the most important are condensation products of chlorinated paraffines or olefines derived therefrom with aromatic hydrocarbons such as benzene, naphthalene and the like. This material and its method of manufacture is disclosed in United States Patent 1,815,022.

It has now been discovered that the yield of the desired product can be greatly increased by carrying out the condensation in a series of steps rather than in a single operation. Not only is the yield improved, but the material is more potent and undesirable by-products are substantially eliminated.

The present method therefore comprises a condensation carried out in a series of condensation steps conducted under the same general conditions, that is to say, of temperature, quantity of catalyst and time, but it will be understood that these conditions may be varied considerably without departing from the spirit of the invention.

Ordinarily the chlorination of the wax is conducted at a temperature from say 100 to 300° F. and the condensation at temperatures below 150° F. and preferably from room temperature to 100 or 125° F. Aluminum chloride is ordinarily used as a catalyst although other materials such as zinc chloride, boron fluoride, titanium chloride and the like may be used in the same manner. In the first step of this process only a portion of the chlorinated paraffine is used with the entire quantity of the aromatic, and condensation is carried out for several hours until the reaction substantially subsides. In general, there is an excess of the aromatic present over what would fully react with the chlorinated paraffine, and by using this excess, tarry or rubbery by-products which are difficult to separate are substantially completely eliminated. After the first condensation step, it is preferable to remove the excess of the aromatic, and this may be done by distillation or by other suitable means. The second and succeeding batches of chlor-paraffine are then added and the condensation is conducted as stated above under the same general conditions. This procedure causes the additional chlor-paraffine to react with the product obtained by the first reaction rather than with any excess naphthalene which may have been present originally. The product of the two or more stages is considerably more potent than the original product produced in the first stage.

It has been found desirable in the practice of this invention to use parafine chlorinated to different degrees in the two or more condensation stages. In general, a more highly chlorinated product is used in the first stage than in those succeeding. For example, it is found that the chlor-paraffine of the first stage should be chlorinated in excess of 12–15% chlorine. In succeeding stages a lower degree of chlorination is used, for example, below 10% and even below 7½%. The chlor-paraffine, as stated above, is produced by bubbling chlorine gas through the melted paraffine at temperatures preferably from 200–300° F. until the increase in weight shows an absorption of say 7½–10% chlorine. A portion of the chlorinated wax may be withdrawn and this portion may be used for a second chlorination step. The remaining portion may then be continuously subjected to chlorination until the gain in weight indicates a 12–20% chlorine content, or even more. This is the fraction which is preferably used in the first condensation step.

The chlor-paraffine may be produced by chlorinating to say 10–15% and then separating the mass into fractions of greater and less chlorine content by extraction with suitable solvents or by other satisfactory means. A solvent such as acetone or acetone mixed with naphtha and other substances may be used for the separation, and while generally, a single separation is all that is required, successive separations can be used to separate the chlorinated product into fractions substantially free from di or poly-chlor derivatives on the one hand and at the same time a fraction of higher chlorine content substantially free from mono-chlor derivatives. It will be understood that the fraction containing substantial quantities of di or poly-chlor derivatives is that used in the first condensation step which is followed by the second condensation step in which the material used is monochlorparaffine.

As an example of the operation and its results, the following may be considered:

100 parts by weight of chlor-paraffine containing 17.4% chlorine are mixed with 30 parts by weight of naphthalene, and the condensation is carried out at a temperature ranging between 70–100° F. in the presence of aluminum chloride and a solvent such as kerosene in proportion suitable for keeping the mass in liquid form. After the reaction has substantially subsided, the product is freed of catalytic sludge and is reduced by steam distillation until a temperature of about 500° F. is reached. The unreacted naphthalene and unchlorinated paraffine wax, as well as the light constituents, are distilled over and the residue comprises 75.5 parts by weight. When the above material is used in proportion of 1% it is capable of reducing the pour point of a particular Spindle oil from 30° to −15° F. It will be seen that the total product was thus capable of reducing the pour point of 7,550 parts by weight of the Spindle oil to −15° F.

The total product (75.5 parts by weight) of the first condensation step is then mixed with 100 parts by weight of chlor-paraffine containing 8.8% chlorine, condensation is conducted at the same temperature and with the same catalyst used in the previous step. This product, after removal of catalyst, is reduced by steam distillation to a temperature of 680° F. and light oil and wax removed as before. The residue is a fluid product comprising 101.5 parts by weight.

When this product is used in 1% concentration in the same Spindle oil referred to above, the pour point is reduced to −25° F. It will be noted that the product is not only more powerful in that it reduces the pour point of the Spindle oil by 55° instead of 45°, but that it is obtained in a considerably increased yield. It is possible with this inhibitor to reduce the pour point of 10,150 parts by weight of the Spindle oil to −25° F.

The product of the two-stage condensation can be used for other purposes besides pour reduction. For example, as a wax separation aid in cold settling separation of wax by centrifugation or otherwise, and it enables the refiner to greatly increase the rate of chilling, for example, at rates of 10° F. per hour, or even 25, 50 or 75° per hour can be used and at the same time a dry, dense wax is formed which quickly settles or may be removed from the oil by filtration.

The invention is not limited to any theory of the mechanism of the condensation process nor to the mechanism of pour reduction, but only to the following claims in which I wish to claim all novelty inherent in the process.

I claim:

1. An improved process for producing a pour inhibitor, comprising the condensation of an aromatic hydrocarbon selected from the members of the benzene and naphthalene series with a halogenated paraffin wax and adding a further quantity of halogenated paraffin wax and obtaining further condensation.

2. An improved process for producing substances useful as pour inhibitors and the like, comprising condensing an aromatic hydrocarbon, selected from the members of the benzene and naphthalene series, with chlorinated paraffin at low temperature with a catalyst of the type of aluminum chloride, removing any excess of aromatic hydrocarbons and carrying on a further condensation with an additional quantity of chlorinated paraffin.

3. An improved process for producing substances useful as pour inhibitors and the like, comprising the condensation of naphthalene with chlor-paraffine at a low condensation temperature in the presence of a catalyst of the type of aluminum chloride, removing the unreacted constituents and completing the condensation with an additional quantity of chlorinated paraffine.

4. An improved process for producing substances useful as pour inhibitors and the like, comprising condensing an aromatic hydrocarbon selected from the members of the benzene and naphthalene series in separate steps, first with a chlor-paraffin relatively rich in chlorine and then with a second batch of less highly chlorinated paraffin.

5. An improved process for producing substances useful as pour inhibitors and the like, comprising condensation of naphthalene with chlor-paraffine containing more than 12% chlorine and then with a second batch containing less than 10% chlorine.

6. An improved process for producing substances useful as pour inhibitors and the like, comprising condensing an aromatic hydrocarbon, selected from the members of the benzene and naphthalene series, first with a chlorinated paraffin wax containing a substantial proportion of poly-chlor derivatives, and then with a second batch containing only mono-chlor derivatives.

7. An improved process for producing substances useful as pour inhibitors and the like, comprising condensation of naphthalene with chlor-paraffine containing 12–20% chlorine, removing excess of the aromatic hydrocarbon and further condensing the product with chlor-paraffine containing from 7.5 to 10% chlorine.

PER K. FROLICH.